(12) United States Patent
Suzuki et al.

(10) Patent No.: US 6,467,962 B1
(45) Date of Patent: Oct. 22, 2002

(54) METAL BEARING AND METHOD OF MANUFACTURING THE SAME

(75) Inventors: Yuzuru Suzuki, Shizuoka-ken (JP); Naoyuki Harada, Shizuoka-ken (JP); Taketoshi Ohyashiki, Shizuoka-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 09/407,464

(22) Filed: Sep. 28, 1999

(30) Foreign Application Priority Data

Sep. 29, 1998 (JP) .......................... 10-275709

(51) Int. Cl.⁷ .......................... F16C 32/06; B21D 53/10
(52) U.S. Cl. ...................... 384/100; 29/898.02; 384/279
(58) Field of Search ............... 384/279, 902, 384/100, 114, 118; 29/898, 898.049, 898.02, 898.045, 898.057

(56) References Cited

U.S. PATENT DOCUMENTS

| | | | |
|---|---|---|---|
| 2,786,726 A | * 3/1957 | Tarr | 384/387 |
| 3,445,148 A | * 5/1969 | Harris et al. | 384/279 |
| 4,847,962 A | * 7/1989 | Puetz | 29/898.02 |
| 4,875,263 A | * 10/1989 | Furukmura | 29/898.02 |
| 5,683,183 A | * 11/1997 | Tanaka et al. | 384/100 |
| 6,000,850 A | * 12/1999 | Takahashi et al. | 384/114 |
| 6,049,983 A | * 4/2000 | Miyasaka et al. | 29/898.057 |
| 6,105,250 A | * 8/2000 | Tanaka et al. | 29/898.02 |
| 6,120,188 A | * 9/2000 | Fujinaka et al. | 284/279 |
| 6,299,356 B1 | * 10/2001 | Okamura et al. | 384/114 |

FOREIGN PATENT DOCUMENTS

| | | | | |
|---|---|---|---|---|
| JP | 57037116 A | * | 3/1982 | |
| JP | 59215239 | * | 12/1984 | 29/898.02 |

\* cited by examiner

*Primary Examiner*—Thomas R. Hannon
(74) *Attorney, Agent, or Firm*—Fay, Sharpe, Fagan, Minnich & McKee, LLP

(57) ABSTRACT

A high-quality bearing with improved controllability which is capable of performing a smooth movement with low vibration, low noise, and high rotation accuracy is provided stably in a short time and at low cost. Grooves 25 of a desired configuration are provided in the outer circumferential surface of a mandrel 12 having an outer diameter slightly smaller than the inner diameter of the metal bearing 10. The mandrel 12 is inserted into the inner circumferential surface of the metal bearing 10. The metal bearing 10 is inserted into a reducing jig or housing 7 having an inner diameter slightly smaller than the outer diameter of the metal bearing 10, thereby causing plastic deformation of metal and forming desired ridges 19 on the inner circumferential surface of the metal bearing 10. When the bearing has an outer diameter D and an inner diameter d, the reducing jig or housing 7 has an inner diameter A, and the mandrel 12 to be inserted into the inner circumferential surface of the bearing has a diameter B, the dimensional relationship between the individual components is established such that an interference ratio $(D-A)/D$ is in the range of 0.005 to 0.035 and $(d-B)/d$ is equal to or smaller than 0.005 provided that $D > A$ and $d > B$ are satisfied.

30 Claims, 4 Drawing Sheets

METAL BEARING AND METHOD OF MANUFACTURING THE SAME

BACKGROUND OF THE INVENTION

1. Field of the Invention

The present invention relates to a metal bearing for use in a high speed motor and to a manufacturing method there for. More particularly, the present invention relates to a method of forming grooves in an inner circumferential surface of the bearing to improve various properties thereof.

2. Description of the Prior Arts

In recent years, requirements for low vibration, high rigidity, low friction, and a long life span have been made on the performance of a bearing for use in a high speed motor for driving a disk in an audio-visual system using a digital disk as a medium, such as OA or AV, or in a computer memory device. To satisfy such requirements at low cost, a so-called kinetic pressure bearing has been used in a motor. In a motor having such kinetic pressure bearing at the center thereof, a lubricant is provided between a rotating shaft of the motor and the inner circumferential surface of the metal bearing disposed in opposing and closely spaced relation to the rotating shaft. In this constitution, a circumferential flow of the lubricant caused by the rotation of the shaft is changed into a diametral flow by the kinetic pressure bearing such that the rotating shaft is enhanced rigidity.

In accordance with a conventional method of manufacturing a kinetic pressure bearing, however, grooves are formed in either of the shaft and the metal bearing by etching or cutting process, so that the process becomes complicated and costly. Accordingly, the resulting bearing are not appropriate for use in a low-cost motor in spite of its excellent performance.

SUMMARY OF THE INVENTION

The present invention has been made in view of the foregoing problem and it is therefore an object of the present invention to stably provide a high-quality bearing with improved controllability which is capable of performing a smooth movement with low vibration, low noise, and high rotation accuracy in a short time and at a low cost.

To attain the foregoing object, in a method of forming ridges in a metal bearing as a kinetic pressure bearing according to the present invention, in which the metal bearing is located at a center of a rotary electric motor, a lubricant is provided between a rotating shaft and an inner circumferential surface of the metal bearing disposed in opposing and closely spaced relation to the rotating shaft, and a circumferential flow of the lubicant caused by the rotation of the shaft is changed into a diametral flow such that the rotating shaft is enhanced rigidity, the method comprising the steps of: inserting a mandrel having grooves of a desired configuration formed in an outer surface thereof into the inner circumferential surface of the metal bearing; and reducing an outer diameter of the metal bearing to form projecting ridges for generating dynamic pressure in the inner circumferential surface of the metal bearing.

In the method of forming ridges in a metal bearing according to the present invention, when the bearing has an outer diameter D and an inner diameter d, a reducing jig has an inner diameter A, the mandrel to be inserted into the inner circumferential surface of the bearing has a diameter B, (D−A)/D is set to be 0.005 to 0.035, and (d−B)/d is set to be equal to or smaller than 0.005, provided that D>A and d>B are satisfied.

In the method of forming ridges in a metal bearing according to the present invention, when the bearing has an outer diameter D and a housing for holding the bearing has an inner diameter C, (D−C)/D is set to be 0.005 to 0.035, provided that C<D is satisfied, the mandrel is inserted into the inner circumferential surface of the metal bearing, a reducing process is performed simultaneously with the insertion of the metal bearing into the housing, and the ridges for generating dynamic pressure are provided in the inner circumferential surface of the metal bearing.

The method of forming ridges in a metal bearing according to the present invention is characterized in that a projecting portion provided at the inner circumferential surface of the metal bearing has a height in the range of 0.001 to 0.005 mm.

The method of forming grooves in a metal bearing according to the present invention is also characterized in that the movement of the mandrel used to machine the inner circumferential surface of the bearing is unfixed and free in a radial direction but fixed only in an axial direction.

The present invention provides a metal bearing formed in accordance with the aforesaid method. The metal bearing includes two separate and distinct metal bearings or two integrally formed metal bearings to arrange the ridges for generating dynamic pressure in two or more rows, and to provide a difference of 0.01 mm or more between the respective inner diameters of the bearings having the ridges in different rows. Furthermore, a sintered alloy is used as a material for composing the bearing. In addition, the ridges for generating dynamic pressure formed in the inner circumferential surface of the bearing are provided in a single-row or plural-row configuration.

According to the present invention, a mandrel having grooves of a desired configuration (herringbone, vertical, spiral, and like configurations) in the outer circumferential surface thereof and having an outer diameter slightly smaller than the inner diameter of a metal bearing is inserted into the inner circumferential surface of the metal bearing followed by reducing the outer diameter of the metal bearing by inserting the metal bearing into a reducing jig or housing having an inner diameter slightly smaller than the outer diameter of the metal bearing, thereby causing plastic deformation of metal and forming desired ridges in the inner circumferential surface of the metal bearing. When the bearing has an outer diameter D and an inner diameter d, the reducing jig or housing 7 has an inner diameter A, and the mandrel to be inserted into the inner circumferential surface of the bearing has a diameter B, the dimensional relationship between the individual components is established such that (D−A)/D is in the range of 0.005 to 0.035 and (d−B)/d is equal to or smaller than 0.005 provided that D>A and d>B are satisfied. The foregoing method enables simple and stable formation of ridges for improving the performance of the bearing and thereby provides a high-performance bearing at low cost.

DETAILED DESCRIPTION OF THE PREFERRED EMBODIMENTS

Figure 1:
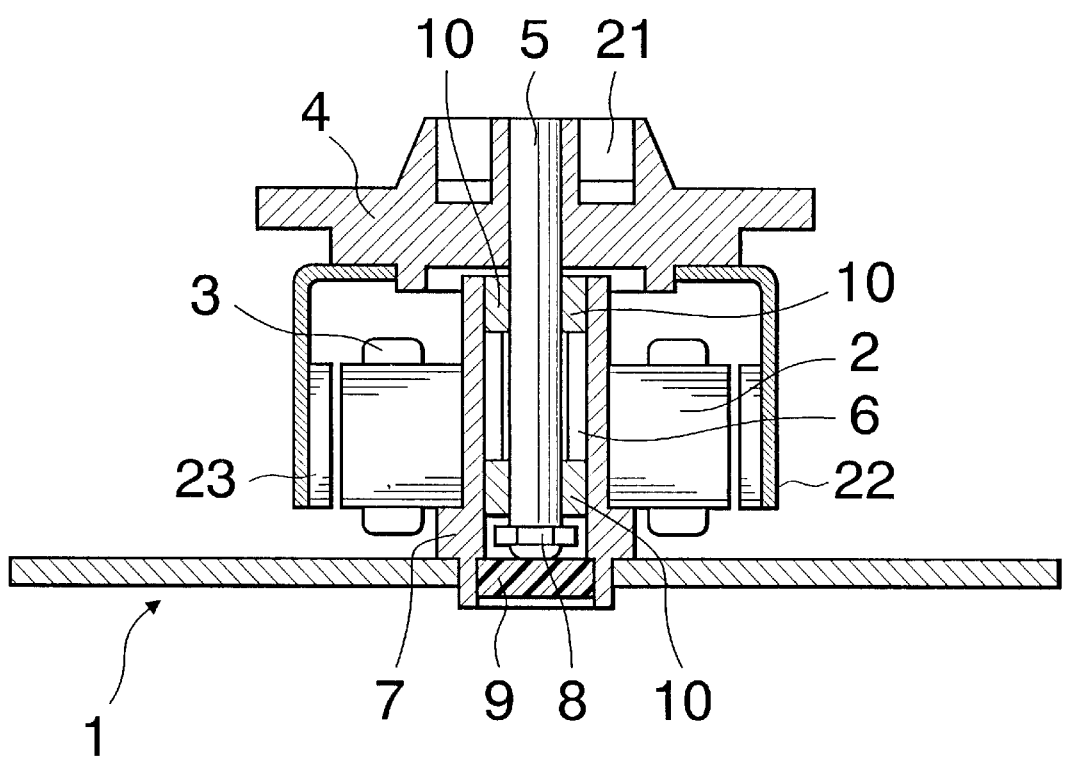
FIG. 1 is a cross-sectional view of an outer-rotor brushless DC motor for use in a CD-ROM driving device employing a metal bearing in accordance with the present invention.

Referring now to the drawings, the embodiments of the present invention will be described.

FIG. 1 is a cross-sectional view of an outer-rotor brushless DC motor for use in a CD-ROM driving device employing a metal bearing in. accordance with the present invention.

In the drawing are depicted: a circuit board 1 which also serves as a base of a motor; a stator yoke 2 composed of soft magnetic steel sheets that are stacked in layers and having salient pole at the outer circumferential surface thereof; a plurality of drive coils 3 provided circumferentially (not all of them are shown) and each composed of a magnet wire wound around the stator yoke 2; and a rotor magnet 23 opposed in spaced relation to the salient poles of the stator yoke 2 and fastened to a cup-shaped rotor yoke 22. A turn table 4 having a suction magnet 21 for clamping for the reception of an optical disk is fastened to the cup surface of the rotor yoke 22. At the center of the turn table 4 is disposed a shaft 5 providing a center of rotation. There are also depicted: metal bearings 10 each having herringbone ridges for generating dynamic pressure on the inner circumferential surface thereof; a collar 6 for determining the spacing between two metal bearings 10 and holding a lubricant; a housing 7 for holding the metal bearings 10; a washer 8 for preventing the turn table from coming off; and a resin plate 9 for holding the turn table in the axial direction.

Figure 2A:
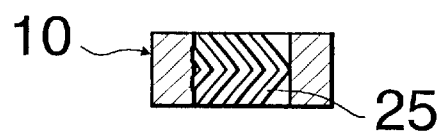
FIGS. 2A, 2B, and 2C are axial cross-sectional views of variations of a metal bearing.
Figure 2B:
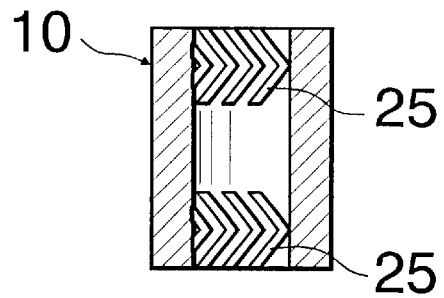
Figure 2C:
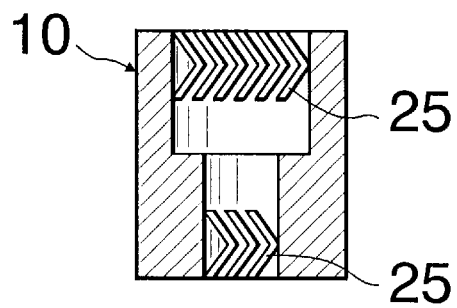

FIGS. 2A, 2B, and 2C are axial cross-sectional views of variations of a metal bearing. Of the drawings, FIG. 2A illustrates the metal bearing 10 of the outer-rotor brushless DC motor shown in FIG. 1. FIG. 2B illustrates a variation of the metal bearing 10 obtained by combining two metal bearings 10 shown in FIG. 1 into one piece. The ridges are formed by means of mandrels 12 which are inserted into the metal bearing 10 from the top side and bottom side thereof, respectively, and withdrawn from the insertion side after the process of reducing the outer diameter of the metal bearing is performed. Thus simultaneous formation of the ridges in the metal bearing 10, enables maintenance of coaxiality with high accuracy, which leads to stability of the bearing.

FIG. 2C illustrates another variation of the metal bearing 10 whose diameter is changed axially such that ridges are formed by insertion of the mandrel 12 and reducing process of one time without being subject to damages of the ridges caused by the withdrawal of the mandrel 12 after the ridges are formed in the metal bearing 10. This allows unidirectional insertion and withdrawal of the mandrel 12, realizes simplicity of a reducer, and facilitates the maintenance of accuracy. As a result, the coaxiality of the metal bearing 10 is further increased and working efficiency is also increased.

Figure 3A:
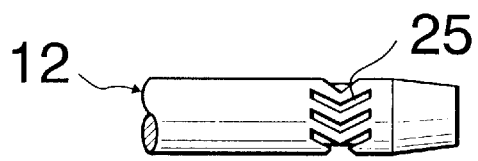
FIGS. 3A, 3B, 3C, and 3D illustrate variations of a mandrel for forming ridges on the inner circumferential surface of a cylindrical sintered alloy.
Figure 3B:
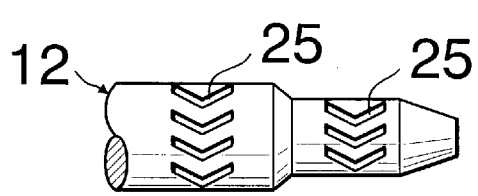
Figure 3C:
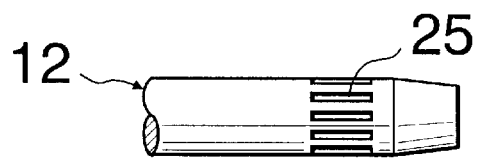
Figure 3D:

FIGS. 3A to 3D illustrate the mandrels 12 each for forming ridges on the inner circumferential surface of the metal bearing 10 made of a cylindrical sintered alloy, each of which has grooves 25 of various configuration on the outer circumferential surfaces thereof. Of the drawings, FIG. 3A shows a herringbone mandrel, FIG. 3*b* shows a two-segmented mandrel, FIG. 3C shows a longitudinal mandrel, and FIG. 3D shows a spiral mandrel.

Figure 4:
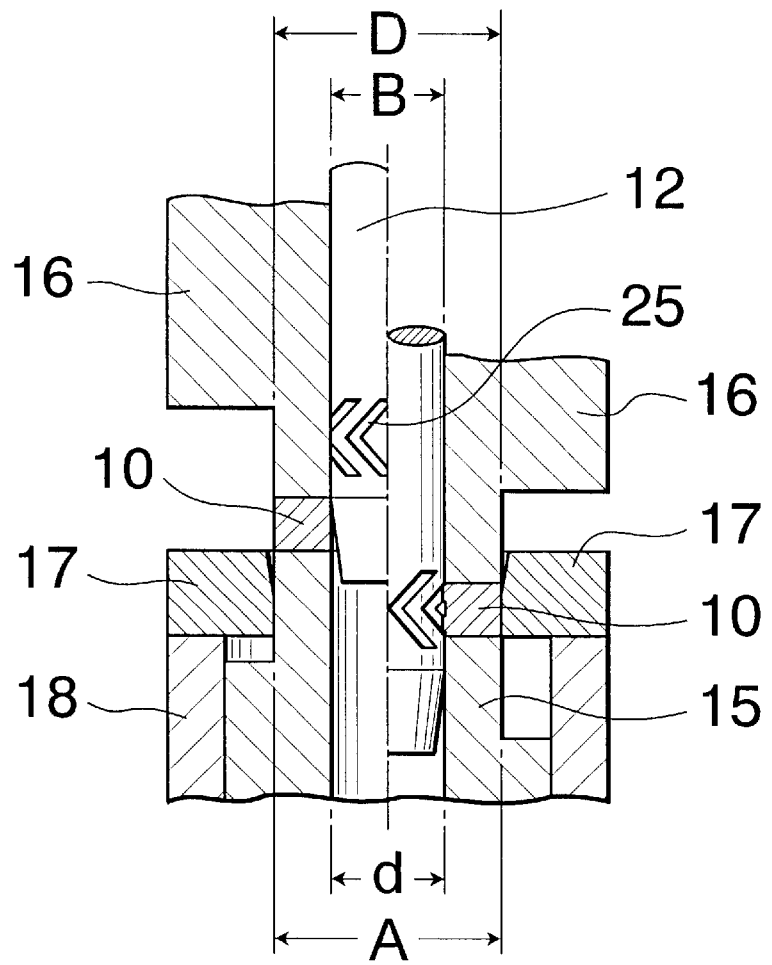
FIG. 4 is a conceptual view showing a process for forming ridges on the inner circumferential surface of the metal bearing.

FIG. 4 is a conceptual view of the process for forming ridges on the inner circumferential surface of the metal bearing 10. Of the drawing, the left-hand side illustrates the metal bearing 10 in the set position and the right-hand side illustrates the metal bearing 10 in the reducing process.

A description will be given to a method of forming projecting herringbone grooves by way of example on the metal bearing 10. The metal bearing 10 is set onto a bearing guide 16 having the mandrel 12 at its center. When the mandrel 12 and the bearing guide 16 are inserted successively into a reducing ring 17 having a guiding tapered portion, the outer diameter of the metal bearing 10 is reduced so that the inner circumferential surface thereof is brought into contact with the mandrel 12 and opposing portions simultaneously enter the grooves, whereby the projecting herringbone ridges 19 for generating dynamic pressure are formed.

After the formation of the ridges is completed, the metal bearing 10 is pushed out of the reducing ring 17 by a knockout guide 15. Then, reducing pressure from the outer circumferential surface of the metal bearing is loosened and the inner diameter of the metal bearing is slightly increased so that the mandrel 12 comes out smoothly.

The grooves 25 to be provided in the mandrel 12 are formed by such a machining method as electric discharge machining, cutting, or etching. Even if each of the grooves 25 is excessively deep, the excessive depth thereof presents no problem provided that it is larger than the finished size of the ridge. This is because the method of forming the ridges 19 on the metal bearing 10 is based on a volume shift. When the metal bearing 10 has an outer diameter D and an inner diameter d, the reducing ring 17 has an inner diameter A, and the mandrel 12 to be inserted into the inner circumferential surface of the metal bearing 10 has an outer diameter B, the dimensional relationship among the individual components is established appropriately such that (D–A)/D is in the range of 0.005 to 0.035 and (d–B)/d is equal to or smaller than 0.005 provided that D>A and d>B are satisfied. If the reducing ring 17 is replaced by the housing 7, the ridges 19 for generating dynamic pressure can be formed simultaneously with the assembly of the bearing, which leads to increased working efficiency.

The height of each of the ridges thus formed falls within the range of 0.001 to 0.005 mm so that the function as a kinetic pressure bearing is performed. In the case where two separate and distinct metal bearings are used or two metal bearings are formed integrally to have ridges arranged in two or more rows (columns), if a difference equal to or more than the height of the ridge (0.010 mm or more) is provided between the respective diameters of the bearings having the ridges in different columns, unidirectional working can be performed and coaxiality and working efficiency are further increased.

Figure 5:
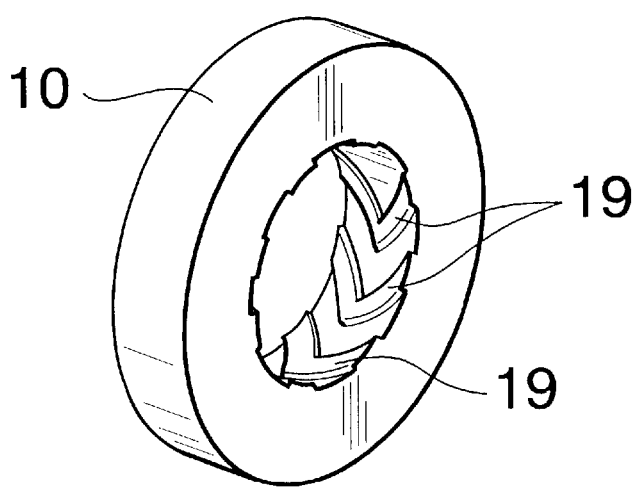
FIG. 5 is a perspective view of the ridges on the inner circumferential surface of the metal bearing after the groves were formed.

FIG. 5 is a perspective view of the metal bearing 10 after ridges are formed in the inner circumferential surface, in which the projecting herringbone ridges 19 for generating dynamic pressure are observed at the inner circumferential surface.

Figure 6:
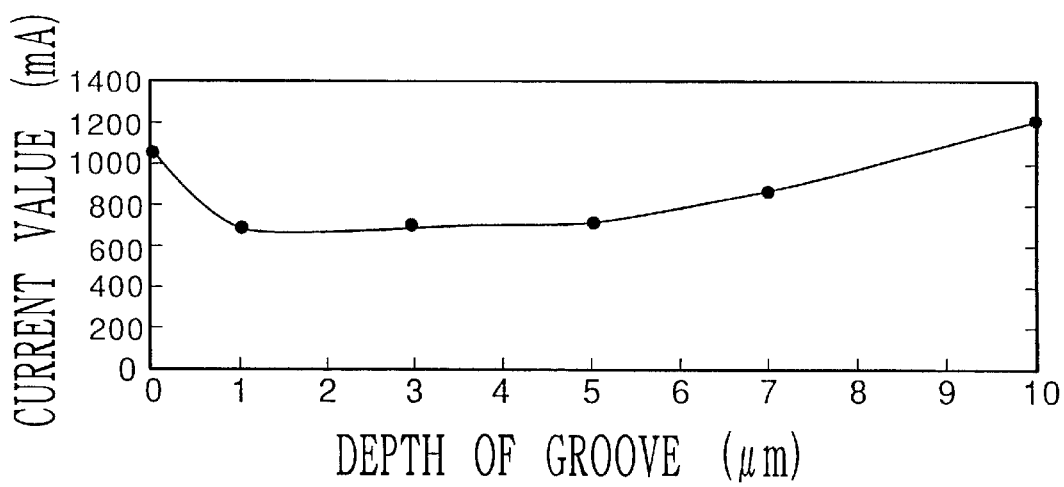
FIG. 6 is a graph showing the relationship between the height of a ridge formed in the metal bearing and the input current of a motor.

FIG. 6 is a graph showing the relationship between the height H of a ridge on the metal bearing 10 and the input current value of a motor. From the graph, it will be understood that, when the height of the ridge is in the range of 1 to 5 $\mu$m, a current is reduced and efficiency is high.

Figure 7:
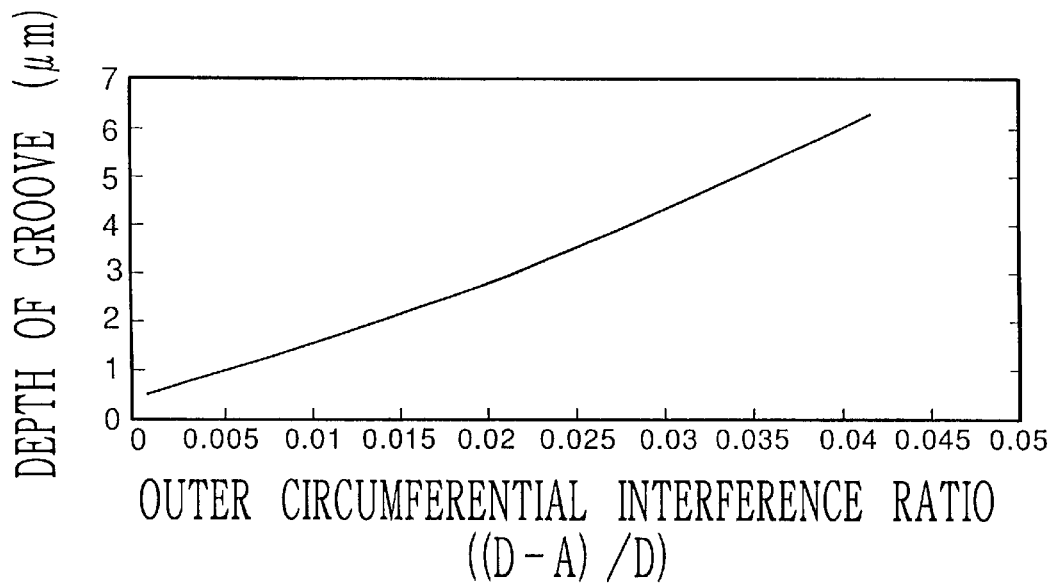
FIG. 7 is a graph showing the relationship between an outer circumferential interference ratio (D–A) and the height H of a ridge.

FIG. 7 is a graph showing the relationship between an outer circumferential interference ratio, i.e., the value of (D−A)/D and the height H of a ridge in the metal bearing 10 when (d−B)/d is equal to or smaller than 0.005.

From FIG. 7, it will be understood that the interference ratio (D−A)/D falls within the range of 0.005 to 0.035 when the height of the ridge is in the range of 1 to 5 μm in which the current value is reduced. The arrangement enables easy formation of a high-efficiency bearing.

To form ridges for generating dynamic pressure on the inner circumferential surface of a metal bearing, in a method of forming ridges in a metal bearing according to the present invention a mandrel having grooves of a desired configuration formed on the outer circumferential surface thereof is inserted into the inner circumferential surface of the metal bearing and the outer diameter of the metal bearing is reduced, thereby the projecting ridges for generating dynamic pressure is formed on the inner circumferential surface of the metal bearing. Accordingly, the following excellent effects are obtained.

In the conventional method of manufacturing a kinetic pressure bearing, ridges are formed directly in a cylindrical sintered alloy by etching or cutting process, so that it is necessary to use high-cost manufacturing equipment. Moreover, a low-cost bearing cannot be provided thereby because of a large number of process steps for manufacturing the bearing. However, the present invention enables low-cost and short-time provision of a high-quality bearing with improved controllability which is capable of performing a smooth movement with low vibration, low noise, and high rotation accuracy.

In the embodiment as above described, ridges are formed on the inner circumferential surface of the metal bearing. It is to be noted, however, that the invention includes formation of grooves on the inner circumferential surface of the metal bearing by means of a mandrel with ridges of given patterns on its surface or other machining tools.

What is claimed is:

1. A method of forming ridges on a metal bearing used as a kinetic pressure bearing, the metal bearing being located at a center of a rotary electric motor, for changing a circumferential flow of a lubricant provided between a rotating shaft and an inner circumferential surface of the metal bearing disposed in opposing and closely spaced relation to the rotating shaft generated with the rotation of the shaft into a diametral flow thereof such that the rotating shaft has enhanced rigidity, the method comprising the steps of:
    (a) setting a cylindrical metal bearing having an outer diameter D and an inner diameter d onto a bearing guide having the same inner diameter d comprising a smaller diameter portion of the same diameter as D and a larger diameter portion;
    (b) setting at the center of said bearing guide a mandrel having an outer diameter that is larger than 0.995 d and grooves of a desired configuration formed on an outer surface thereof;
    (c) inserting the mandrel into a reducing ring having a guiding tapered portion and an inner diameter that is equal to about 0.995 D to 0.965 D; and
    (d) pressing said bearing guide in its axial direction to reduce the outer diameter of said metal bearing so that projecting ridges of the desired configuration for generating dynamic pressure are formed on the inner circumferential surface of the metal bearing by said grooves on the mandrel.

2. The method of forming ridges on a metal bearing according to claim 1, wherein the movement of the mandrel used to machine the inner circumferential surface of the bearing is unfixed and free in a radial direction and fixed only in an axial direction.

3. A metal bearing formed in accordance with the method as recited in claim 1.

4. The metal bearing according to claim 3 including two separate and distinct metal bearings or two integrally formed metal bearings, wherein the ridges for generating dynamic pressure are arranged in two or more rows and a difference of 0.01 mm or more is provided between the respective inner diameters of the bearings having the ridges in different rows.

5. The metal bearing according to claim 3, wherein a sintered alloy is used as a material for composing the bearing.

6. The metal bearing according to claim 3, wherein the ridges for generating dynamic pressure formed in the inner circumferential surface of the bearing are provided in a single-row configuration.

7. The metal bearing according to claim 3, wherein the ridges for generating dynamic pressure formed in the inner circumferential surface of the bearing are provided in a plural-row configuration.

8. The method of forming ridges on a metal bearing according to claim 1, wherein a projecting portion provided at the inner circumferential surface of the metal bearing has a height in the range of 0.001 to 0.005 mm.

9. A method of forming ridges on a metal bearing used as a kinetic pressure bearing, the metal bearing being located at a center of a rotary electric motor, for changing a circumferential flow of a lubricant provided between a rotating shaft and an inner circumferential surface of the metal bearing disposed in opposing and closely spaced relation to the rotating shaft generated with the rotation of the shaft into a diametral flow thereof such that the rotating shaft has enhanced rigidity, the method comprising the steps of:
    (a) setting a cylindrical metal bearing having an outer diameter D and an inner diameter d onto a bearing guide having the same inner diameter d comprising a smaller diameter portion of the same diameter as D and a larger diameter portion;
    (b) setting at the center of said bearing guide a mandrel having an outer diameter that is larger than 0.995 d and grooves of a desired configuration formed on an outer surface thereof;
    (c) inserting the mandrel into a housing which holds said metal bearing in the motor and has an inner diameter that is equal to about 0.995 D to 0.965 D; and
    (d) pressing said bearing guide in its axial direction to reduce the outer diameter of said metal bearing so that projecting ridges of the desired configuration for generating dynamic pressure are formed on the inner circumferential surface of the metal bearing by said grooves on the mandrel.

10. The method of forming ridges on a metal bearing according to claim 9, wherein a projecting portion provided at the inner circumferential surface of the metal bearing has a height in the range of 0.001 to 0.005 mm.

11. The method of forming ridges on a metal bearing according to claim 9, wherein the movement of the mandrel used to machine the inner circumferential surface of the bearing is unfixed and free in a radial direction and fixed only in an axial direction.

12. A metal bearing formed in accordance with the method as recited in claim 9.

13. The metal bearing according to claim 12 including two separate and distinct metal bearings or two integrally formed metal bearings, wherein the ridges for generating dynamic pressure are arranged in two or more rows and a difference of 0.01 mm. or more is provided between the respective inner diameters of the bearings having the ridges in different rows.

14. The metal bearing according to claim 12, wherein a sintered alloy is used as a material for composing the bearing.

15. The metal bearing according to claim 12, wherein the ridges for generating dynamic pressure formed in the inner circumferential surface of the bearing are provided in a single-row configuration.

16. The metal bearing according to claim 12, wherein the ridges for generating dynamic pressure formed in the inner circumferential surface of the bearing are provided in a plural-row configuration.

17. A method of forming grooves on a metal bearing used as a kinetic pressure bearing, the metal bearing being located at a center of a rotary electric motor, for changing a circumferential flow of a lubricant provided between a rotating shaft and an inner circumferential surface of the metal bearing disposed in opposing and closely spaced relation to the rotating shaft generated with the rotation of the shaft into a diametral flow thereof such that the rotating shaft has enhanced rigidity, the method comprising the steps of:

(a) setting a cylindrical metal bearing having an outer diameter D and an inner diameter d onto a bearing guide having the same inner diameter d comprising a smaller diameter portion of the same diameter as D and a larger diameter portion;

(b) setting at the center of said bearing guide a mandrel having an outer diameter that is larger than 0.995 d and ridges of a desired configuration formed on an outer surface thereof;

(c) inserting the mandrel into a reducing ring having a guiding tapered portion and an inner diameter that is equal to about 0.995 D to 0.965 D; and (d) pressing said bearing guide in its axial direction to reduce the outer diameter of said metal bearing so that grooves of the desired configuration for generating dynamic pressure are formed on the inner circumferential surface of the metal bearing by said ridges on the mandrel.

18. A metal bearing formed in accordance with the method as recited in claim 17.

19. The metal bearing according to claim 18 including two separate and distinct metal bearings or two integrally formed metal bearings, wherein the grooves for generating dynamic pressure are arranged in two or more rows and a difference of 0.01 mm or more is provided between the respective inner diameters of the bearings having the grooves in different rows.

20. The metal bearing according to claim 18, wherein a sintered alloy is used as a material for composing the bearing.

21. The metal bearing according to claim 18, wherein the grooves for generating dynamic pressure formed in the inner circumferential surface of the bearing are provided in a single-row configuration.

22. The metal bearing according to claim 18, wherein the grooves for generating dynamic pressure formed in the inner circumferential surface of the bearing are provided in a plural-row configuration.

23. The method of forming grooves on a metal bearing according to claim 17, wherein the movement of the mandrel used to machine the inner circumferential surface of the bearing is unfixed and free in a radial direction and fixed only in an axial direction.

24. A method of forming grooves on a metal bearing used as a kinetic pressure bearing, the metal bearing being located at a center of a rotary electric motor, for changing a circumferential flow of a lubricant provided between a rotating shaft and an inner circumferential surface of the metal bearing disposed in opposing and closely spaced relation to the rotating shaft generated with the rotation of the shaft into a diametral flow thereof such that the rotating shaft has enhanced rigidity, the method comprising the steps of:

(a) setting a cylindrical metal bearing having an outer diameter D and an inner diameter d onto a bearing guide having the same inner diameter d comprising a smaller diameter portion of the same diameter as D and a larger diameter portion;

(b) setting at the center of said bearing guide a mandrel having an outer diameter that is larger than 0.995 d and ridges of a desired configuration formed on an outer surface thereof;

(c) inserting the mandrel into a housing which holds said metal bearing in the motor and has an inner diameter that is equal to about 0.995 D to 0.965 D; and (d) pressing said bearing guide in its axial direction to reduce the outer diameter of said metal bearing so that grooves of the desired configuration for generating dynamic pressure are formed on the inner circumferential surface of the metal bearing by said ridges on the mandrel.

25. The method of forming grooves on a metal bearing according to claim 24, wherein the movement of the mandrel used to machine the inner circumferential surface of the bearing is unfixed and free in a radial direction and fixed only in an axial direction.

26. A metal bearing formed in accordance with the method as recited in claim 24.

27. The metal bearing according to claim 26 including two separate and distinct metal bearings or two integrally formed metal bearings, wherein the grooves for generating dynamic pressure are arranged in two or more rows and a difference of 0.01 mm or more is provided between the respective inner diameters of the bearings having the grooves in different rows.

28. The metal bearing according to claim 26, wherein a sintered alloy is used as a material for composing the bearing.

29. The metal bearing according to claim 26, wherein the grooves for generating dynamic pressure formed in the inner circumferential surface of the bearing are provided in a single-row configuration.

30. The metal bearing according to claim 26, wherein the grooves for generating dynamic pressure formed in the inner circumferential surface of the bearing are provided in a plural-row configuration.

* * * * *